(12) United States Patent
Zeng et al.

(10) Patent No.: US 7,154,965 B2
(45) Date of Patent: Dec. 26, 2006

(54) SOFT DETECTION OF DATA SYMBOLS IN THE PRESENCE OF INTERSYMBOL INTERFERENCE AND TIMING ERROR

(75) Inventors: Wei Zeng, Cambridge, MA (US); Aleksandar Kavčić, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 818 days.

(21) Appl. No.: 10/266,241

(22) Filed: Oct. 8, 2002

(65) Prior Publication Data

US 2004/0066863 A1    Apr. 8, 2004

(51) Int. Cl.
*H03D 1/00* (2006.01)
*H04L 27/06* (2006.01)

(52) U.S. Cl. ............... 375/340; 375/316; 375/265; 375/341; 714/786; 714/794; 714/795

(58) Field of Classification Search ............ 375/265, 375/340, 341; 714/786, 794, 795
See application file for complete search history.

(56) References Cited

U.S. PATENT DOCUMENTS

| | | | |
|---|---|---|---|
| 5,132,988 A | 7/1992 | Fisher et al. | |
| 5,488,635 A * | 1/1996 | Chennakeshu et al. | 375/340 |
| 5,594,742 A | 1/1997 | Hemmati | |
| 5,619,539 A | 4/1997 | Coker et al. | |
| 5,636,208 A | 6/1997 | Chang et al. | |
| 5,651,015 A | 7/1997 | Bain | |
| 5,802,118 A * | 9/1998 | Bliss et al. | 375/350 |
| 5,825,832 A | 10/1998 | Benedetto | |
| 5,828,675 A | 10/1998 | Chen et al. | |
| 5,889,823 A | 3/1999 | Agazzi et al. | |
| 5,917,855 A | 6/1999 | Kim | |
| 6,128,765 A | 10/2000 | Ross et al. | |
| 6,189,126 B1 | 2/2001 | Ulmer et al. | |
| 6,201,839 B1 | 3/2001 | Kavcic et al. | |
| 6,215,831 B1 | 4/2001 | Nowack et al. | |
| 6,411,224 B1 | 6/2002 | Wilson et al. | |
| 6,438,180 B1 | 8/2002 | Kavcic et al. | |
| 6,452,979 B1 | 9/2002 | Ariel et al. | |
| 6,452,984 B1 | 9/2002 | Banister et al. | |
| 6,460,161 B1 | 10/2002 | Crozier et al. | |

(Continued)

FOREIGN PATENT DOCUMENTS

WO    WO 98/20617    5/1998

(Continued)

OTHER PUBLICATIONS

L. R. Bahl et al., "Optimal Decoding of Linear Codes for Minimizing Symbol Error Rate," *IEEE Transactions on Information Theory*, Mar. 1974, pp. 284-287.

(Continued)

*Primary Examiner*—Jay K. Patel
*Assistant Examiner*—Erin M. File
(74) *Attorney, Agent, or Firm*—Robert P. Lenart, Esq.; Pietragallo, Bosick & Gordon LLP

(57) ABSTRACT

A method for detecting data symbols corrupted by intersymbol interference and timing error, comprises calculating a first plurality of state probabilities for received symbols using a forward recursive process on a joint intersymbol interference/timing error (ISI/TE) trellis, calculating a second plurality of state probabilities for the received symbols using a backward recursive process on the joint ISI/TE trellis, and using the first plurality of state probabilities and the second plurality of state probabilities to calculate a posteriori state transition probabilities for the received symbols. An apparatus that performs the method is also disclosed.

29 Claims, 11 Drawing Sheets

U.S. PATENT DOCUMENTS

| | | | |
|---|---|---|---|
| 7,003,041 B1 * | 2/2006 | Sim | 375/242 |
| 2001/0016002 A1 | 8/2001 | Shim et al. | |
| 2001/0022820 A1 | 9/2001 | Zhengdi et al. | |
| 2002/0048331 A1 | 4/2002 | Tran et al. | |
| 2002/0071504 A1 | 6/2002 | Chen et al. | |
| 2002/0095640 A1 * | 7/2002 | Arad et al. | 714/792 |
| 2003/0123587 A1 * | 7/2003 | Blaum et al. | 375/354 |

FOREIGN PATENT DOCUMENTS

| | | |
|---|---|---|
| WO | WO 02/49219 A2 | 6/2002 |

OTHER PUBLICATIONS

A. Kavčić et al., "Expedient Media Noise Modeling: Isolated and Interacting Transitions," *IEEE Transactions on Magnetics*, vol. 32, Sep. 1996, pp. 3875-3877.

A. Kavčić et al., "Signal-Dependent Correlation-Sensitive Branch Metrics for Viterbi-like Sequence Detectors," *Proc. IEEE ICC '98*, Atlanta, GA, Jun. 1998, (5 pgs.).

A. Kavčić et al., "Maximum Likelihood Sequence Estimation in Channels with Intersymbol Interference and Noise Memory," *ISIT*, Cambridge, MA, Aug. 16-21, 1998, (1 pg.).

M. Schmidt et al., "On Memory Redundancy in the BCJR Algorithm for Nonrecursive Shift Register Processes," *IEEE Transactions on Information Theory*, vol. 46, No. 4, Jul. 2000, pp. 1580-1584.

X. Ma et al., "Optimal Quantization for Soft-Decision Decoding Revisited," *International Symposium on Information Theory and Its Applications*, Oct. 7-11, 2002, (3 pgs.).

X. Ma et al., "Path Partitions and Forward-Only Trellis Algorithms," *Submitted to IEEE Transactions on Information Theory*, pp. 100-115.

R. Shibuya et al., "Recursive Algorithm for Efficient Map Decoding of Binary Linear Block Codes," (4 pgs.).

* cited by examiner

SOFT DETECTION OF DATA SYMBOLS IN THE PRESENCE OF INTERSYMBOL INTERFERENCE AND TIMING ERROR

FIELD OF THE INVENTION

This invention relates to methods and apparatus for detecting transmitted data symbols when the sampled waveform is subject to intersymbol interference and timing error.

BACKGROUND OF THE INVENTION

Timing recovery is essential for any digital communications system employing coherent detection. In many systems (e.g., wireless), 30% of the transmitted energy is devoted to pilot tones that, among other functions, aid the timing recovery. In magnetic recording systems, similar strategies could be employed, but the price would be unacceptable as the disk area devoted to timing tones would lower the area available for the storage of data.

A typical disc drive includes one or more discs mounted for rotation on a hub or spindle. A typical disc drive also includes a transducer supported by a hydrodynamic air bearing which flies above each disc. The transducer and the hydrodynamic air bearing are collectively referred to as a data head. A drive controller is conventionally used for controlling the disc drive based on commands received from a host system. The drive controller controls the disc drive to retrieve information from the discs and to store information on the discs.

In one conventional disc drive, an electromechanical actuator operates within a negative feedback, closed-loop servo system. The actuator moves the data head radially over the disc surface for track seek operations and holds the transducer directly over a track on the disc surface for track following operations.

Information is typically stored in concentric tracks on the surface of the discs by providing a write signal to the data head to write information on the surface of the disc representing the data to be stored. In retrieving data from the disc, the drive controller controls the electromechanical actuator so that the data head flies above the disc, sensing the information on the disc, and generating a read signal based on the information. The read signal is typically conditioned and then decoded by the drive read/write channel and the controller to recover the data.

A Viterbi detector has been used in the past as a data detector in a disc drive read channel. A Viterbi detector acts as a maximum-likelihood sequence estimator when the input to the detector consists of a signal plus additive white, Gaussian noise, and when a typical branch metric (e.g., the square of the error in the signal provided to the detector) is used.

The magnetic recording channel is a digital baseband communication channel with intersymbol interference, non-stationary noise and channel memory. Recent results have shown that Gauss-Markov noise approximations lead to nearly optimal signal detection methods.

As recording densities of disc drives increase, there is an increasing probability of interference between adjacent areas of magnetization in the storage media. Signals detected by magnetic read heads are typically sampled at times controlled by a clock signal. Variations in the timing of clock pulses can produce timing error in the samples. Thus there is a need for a method and apparatus for symbol recovery that can be incorporated into a receiver that receives data symbols which are subject to intersymbol interference and timing error.

SUMMARY OF THE INVENTION

The present invention provides a method for detecting data symbols corrupted by intersymbol interference and timing error, comprising: calculating a first plurality of state probabilities for received symbols using a forward recursive process on a joint intersymbol interference/timing error (ISI/TE) trellis, calculating a second plurality of state probabilities for the received symbols using a backward recursive process on the joint ISI/TE trellis, and using the first plurality of state probabilities and the second plurality of state probabilities to calculate a posteriori state transition probabilities for the received symbols.

The method can further comprise estimating the phase of the timing error of the data symbols using the first plurality of state probabilities and the second plurality of state probabilities.

The state probabilities can be windowed and normalized, and the symbols can be representative of data stored in a data storage medium.

The invention also encompasses an apparatus for detecting data symbols corrupted by intersymbol interference and timing error, comprising means for calculating a first plurality of state probabilities for received symbols using a forward recursive process on a joint intersymbol interference/timing error (ISI/TE) trellis, means for calculating a second plurality of state probabilities for the received symbols using a backward recursive process on the joint ISI/TE trellis, and means for using the first plurality of state probabilities and the second plurality of state probabilities to calculate a posteriori state transition probabilities for the received symbols.

The apparatus can further comprise means for estimating the phase of the timing error of the data symbols using the first plurality of state probabilities and the second plurality of state probabilities.

The apparatus can also comprise means for windowing the state probabilities and means for normalizing the state probabilities, and the symbols can be representative of data stored in a data storage medium.

DETAILED DESCRIPTION OF THE INVENTION

Figure 1:
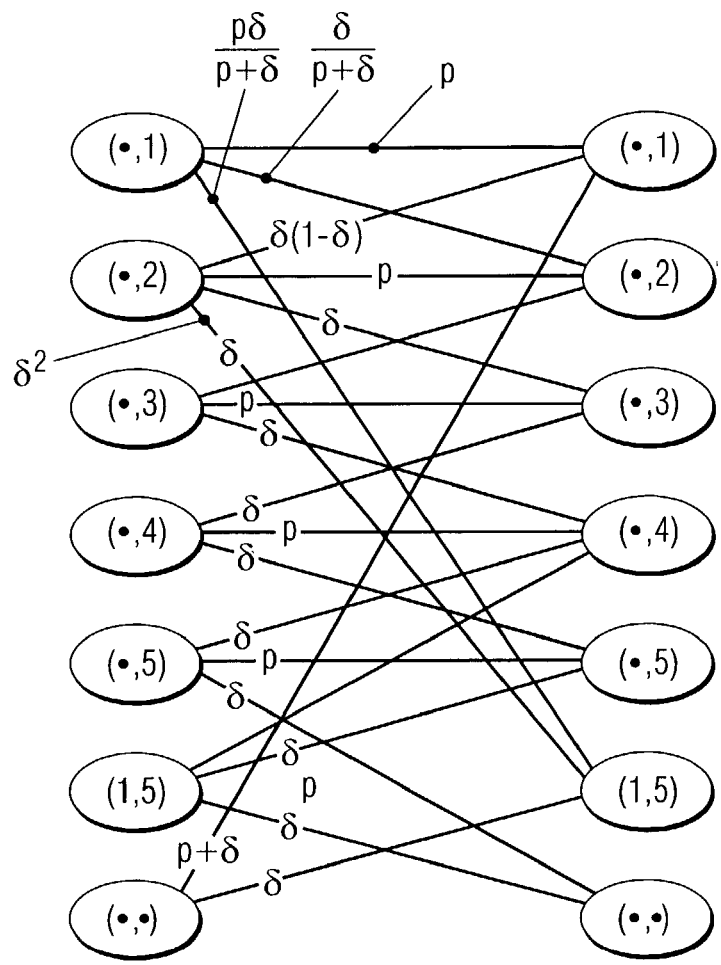
FIG. 1 is a timing error trellis diagram.

This invention addresses the issue of detecting transmitted symbols even when there is a timing error in the sampled waveform. The detected symbols can be 'hardened', which would give rise to a traditional detector, or they can be passed on as 'soft' decisions, which would be beneficial for soft-decision iterative decoding algorithms. The following description describes the 'soft' version. The 'hard' version is obtained by quantizing the 'soft' decisions.

For the purposes of the following description, it is assumed that the timing error can be modeled by a first order Markov process. Extensions to higher order Markov processes are trivial. Let T be the symbol interval. An ideal system would sample the waveform at times 0, T, 2T, 3T, and so on. However, because of the timing errors, $\epsilon_k$, the system samples the waveforms at time instants $(0+\epsilon_0)T$, $(1+\epsilon_1)T$, $(2+\epsilon_2)T$, $(3+\epsilon_3)T$, $(4+\epsilon_4)T$, and so on. The assumption is that the variable $\epsilon_k$ is a Markov process, i.e., the conditional probability function of $\epsilon_k$ depends only on the last value $\epsilon_{k-1}$:

$$f(\epsilon_k|\epsilon_{k-1}, \epsilon_{k-2}, \epsilon_{k-3}, \epsilon_{k-4}, \ldots) = f(\epsilon_k|\epsilon_{k-1})$$

Next, we quantize the variable $\epsilon_k$ to get a new variable:

$$\xi_k = \text{quant}(\epsilon_k).$$

The variable $\xi_k$, being discrete in value, can be represented by a Markov chain. For example, assume that the process $\epsilon_k$ is a Brownian motion process. The process can be quantized to, for example, 5 levels per symbol interval. That is, $$\xi_k = \text{quant}(\epsilon_k) = \text{round}(5 \cdot \epsilon_k)/5,$$

where the rounding is taken to the nearest integer. Clearly, the variable $\xi_k$ can take values in the countable set $\{\ldots, -0.4T, -0.2T, 0, 0.2T, 0.4T, \ldots\}$. The number of quantization levels can be chosen arbitrarily (but it needs to be relatively large to keep the quantization error in check). Here we chose a small number, i.e. 5, as the number of quantization levels per symbol interval to simplify the description of the invention.

Since $\epsilon_k$ is a Brownian motion process, we assume that the resulting quantized process $\xi_k$ is also a Markov chain, i.e., $$P(\xi_k|\xi_{k-1}) = \delta \text{ if } \xi_k = \xi_{k-1} \pm 0.2T$$

$$P(\xi_k|\xi_{k-1}) = p = 1 - 2\delta \text{ if } \xi_k = \xi_{k-1}$$

$$P(\xi_k|\xi_{k-1}) = 0 \text{ otherwise.}$$

The probabilities $P(\xi_k|\xi_{k-1})$ may depend (and in a real system do depend) on the values of $\xi_k$ and $\xi_{k-1}$, but here, without loss of generality, we assume that the probabilities are not dependent on the values of $\xi_k$ and $\xi_{k-1}$.

First, a timing error trellis is constructed. To construct the timing error trellis structure, define the k-th symbol interval as the semi-open segment $((k-1)T, kT]$ on the real time axis. If there were no timing error, then one would take exactly one sample per symbol interval. However, due to the timing error, there could be 0, 1 or 2 samples per each symbol interval. If a Markov timing error process is quantized to 5 values per symbol interval, then the interval $((k-1)T, kT]$ may be sampled in 7 different ways:

0) 0 samples in $((k-1)T, kT]$
   referred to as sampling state (●,●)
1) 1 sample in $((k-1)T, kT]$ at time $(k-1)T+T/5$
   referred to as sampling state (●,1)
2) 1 sample in $((k-1)T, kT]$ at time $(k-1)T+2T/5$
   referred to as sampling state (●,2)
3) 1 sample in $((k-1)T, kT]$ at time $(k-1)T+3T/5$
   referred to as sampling state (●,3)
4) 1 sample in $((k-1)T, kT]$ at time $(k-1)T+4T/5$
   referred to as sampling state (●,4)
5) 1 sample in $((k-1)T, kT)$ at time $(k-1)T+T$
   referred to as sampling state (●,5)
6) 2 samples in $((k-1)T, kT)$ at times $(k-1)T+T/5$ and $(k-1)T+T$
   referred to as sampling state (1,5)

The choice of state notation reflects the positions at which the interval is sampled. For example:
a) The state (●,●) denotes that no sample falls in the interval.
b) The state (●, i) denotes that one sample is taken at time $(k-1)T+i \cdot T/5$.
c) The state (1,5) denotes that two samples are taken: one at time $(k-1)T+1 \cdot T/5$ and the other at time at time $(k-1)T+5 \cdot T/5$.

This represents an example based on the assumed 5 timing error quantization levels on the interval $((k-1)T, kT]$. Generally, if we assume Q timing error quantization levels on the interval $((k-1)T, kT)$, we will have Q+2 states. They are the no-sample state (●,●), the 2-sample state (1, Q), and Q one-sample states (●, q), where q=1, 2, ..., Q.

With the sampling states defined, we can connect them into a trellis. The left state denotes where the interval $((k-2)T, (k-1)T]$ is sampled, while the right state denotes where the interval $((k-1)T, kT]$ is sampled. A trellis of these timing states is shown in FIG. 1.

The trellis displayed in FIG. 1 describes the timing error behavior. Note that some branches carry 2 samples, while some branches carry no sample. For example, all branches leading to the state (1, 5) carry 2 samples, while all branches leading to the state (●,●) carry 0 samples. The trellis in FIG. 1 does not specify what the noiseless samples are. For that, we will need to develop an intersymbol interference (ISI) trellis.

Figure 2:
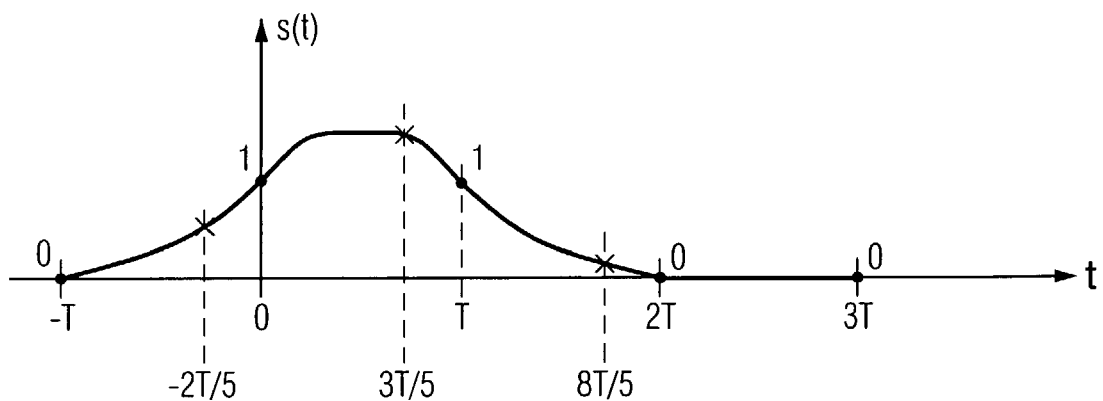
FIG. 2 is a graph illustrating an example symbol pulse.

To construct the ISI trellis structure, assume that the signal to be detected has a pulse shape as shown in FIG. 2. As seen from FIG. 2, if all samples are taken at multiples of T, the ISI length is 1, and the partial response polynomial has the form h(D)=1+D. However, if there is a timing offset (as indicated by the samples denoted by x in FIG. 2), the ISI length is 2. Thus, we generally assume that the ISI length is 2, and construct a standard 4-state symbol trellis. An extension to any other length of ISI is straightforward.

Figure 3:
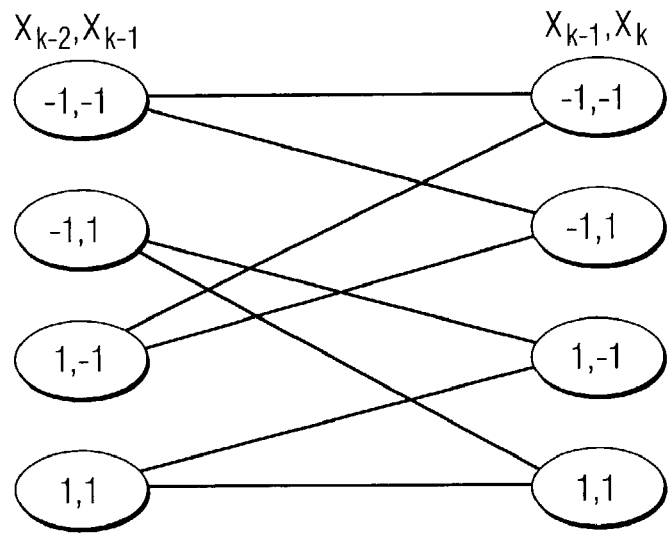
FIG. 3 is an intersymbol interference trellis diagram.

FIG. 3 shows the ISI trellis. Notice that we did not give the noiseless branch values in the trellis in FIG. 3. This is because these values will depend on the sampling instants. In some cases we may even have 2 (or even 0) samples per branch.

A final trellis, F, can be obtained as a cross product of the two trellises in FIGS. 1 and 3. The resulting trellis therefore has 28 states. Generally, if the symbol interval is quantized to Q levels, and the ISI length of a perfectly sampled pulse is I, then the final trellis will have $2^{(I+1)} \cdot (Q+2)$ states.

It is impractical to draw the whole 28-state final trellis. For this reason, we only give examples of a few branches in the trellis.

a) If in the k-th symbol interval we go from state $[x_{k-2}, x_{k-1}, (\bullet, 5)]=[-1, 1, (\bullet, 5)]$ to state $[x_{k-1}, x_k, (\bullet, 5)]=[1, 1, (\bullet, 5)]$, then there is no timing error, and the noiseless output is $y_k=x_k+x_{k-1}=1+1=2$.

b) If we go from state $[-1, 1, (\bullet, 2)]$ to state $[1, 1, (\bullet, 3)]$, then there is a timing error, and the noiseless output is $y_k=(-1)\cdot a_1+1\cdot a_2+1\cdot a_3$.

c) If we go from state $[-1, 1, (1, 5)]$ to state $[1, 1, (\bullet, \bullet)]$, then the branch carries no signal sample.

d) If we go from state $[-1, 1, (\bullet, 1)]$ to state $[1, 1, (1, 5)]$, then the branch carries two samples. They are: $(-1)\bullet b_1 + 1\bullet b_3$ and $1+1=2$.

Figure 4:
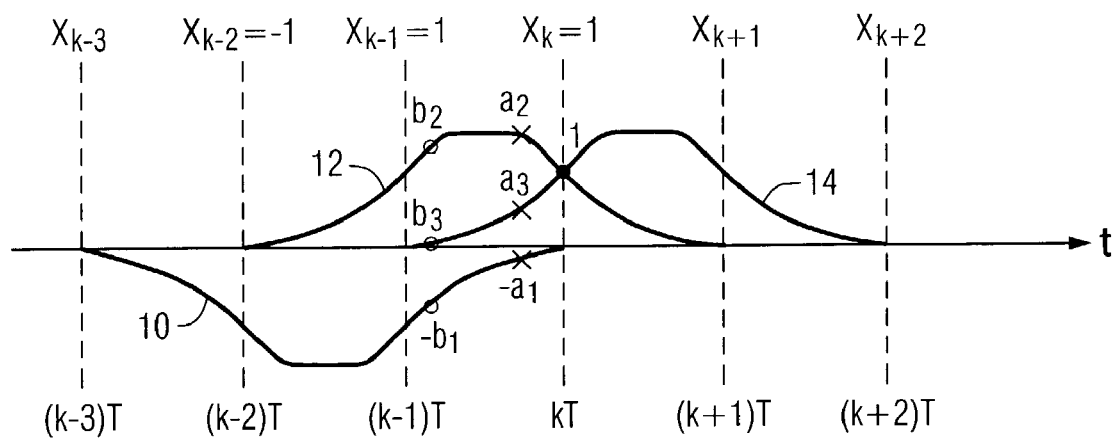
FIG. 4 is a graph illustrating a plurality of signal pulses.

These examples are illustrated in FIG. 4, which shows symbol pulses 10, 12 and 14 and the various sampling points.

Thus we have described a trellis that can be used to perform symbol detection in accordance with the invention. We will now describe the detection method that uses this trellis.

Consider the problem of joint maximum a posteriori probability (MAP) detection of each input symbol and the sampling offset at each sampling point based on the received sequence $Y_1^L$. Assume that the read back signals are corrupted not only by intersymbol interference (ISI) and timing uncertainty, but also by channel noise, say, additive Gaussian noise. Extensions to signal-dependant noise are straightforward. In a communication system, the signals are sent from transmitters. In magnetic recording systems, signals are recorded in discs, so the "transmission" of signals, in such cases, means the signals being written on a disk. Similarly received signals mean the read back signals.

Suppose the Markov timing error process is quantized to Q values per symbol interval. We define $T=\{(\bullet,\bullet), (\bullet,1), (\bullet,2), \ldots, (\bullet,Q),(1,Q)\}$ to be the timing states, and $B=\{(i,j)\}$ to be the intersymbol interference state, where $i, j=\pm 1$. (Here we assumed that the ISI length is I=1 as in FIG. 2. Extensions to larger values of I are straightforward.) The final set of state in our trellis is $F=B\times T$.

Denote $S_t \in F$ as the state at time t (or, the $t_{th}$ column in the trellis). We wish to calculate the following probabilities (soft outputs):

$$\lambda_t(m)=P(S_t=m; y_1^L), \quad (1)$$

$$\sigma_i(\psi)=P(\phi(i)=\psi; y_1^L), \quad (2)$$

where $\phi(i)$ is the overall offset of the $i_{th}$ sample relative to $i\cdot T$, and $$m \in F, \psi = 0, \pm\frac{T}{Q}, \pm\frac{2T}{Q}, \ldots .$$

From these soft-outputs, we can readily calculate the a posteriori probabilities of each input symbol, $X_t$, and the timing uncertainty at each sampling point. For example:

$$P(X_t = 1 \mid y_1^L) = \sum_{m \in \{(\pm 1,1)\}\times \tau} \lambda_t(m)/P(y_1^L) \quad (3a)$$

$$P(\phi_i=\psi \mid y_1^L)=\sigma_i(\psi)/P(y_1^L), \quad (3b)$$

where $$\psi = 0, \pm\frac{T}{Q}, \pm\frac{2T}{Q}, \ldots ,$$

is the discrete time offset of the $i_{th}$ sampling. $P(y_1^L)$ is a constant for a given received sequence. Since this $P(y_1^L)$ is a constant, it will not influence any decision results, so it need not be calculated. (If we need to calculate it, it is just the value of $\beta(0, m_0, 0)$, where $m_0$ is the $[-1,-1, (\bullet, Q)]$ state. This is discussed below.) We can also normalize all the $\alpha(t,m,i)$ (or $\beta(t,m,i)$) values so that they add up to 1. This will prevent the values from getting too small to be handled by the precision of practical computers as t becomes large.

To calculate the soft-outputs in (1) and (2), we first give some definitions. We use $Z_t$ to represent the output symbols (i.e. output samples) corresponding to $X_t$. Note that $Z_t$ may include one symbol, two symbols, or no symbol, depending on how many samples we have in the symbol period. $Z_t^n$ represents the sequence of output symbols corresponding to the input sequence $X_t^n$.

We define the following probability functions:

$$\alpha(t,m,i)=P(S_t=m; Z_1^t=y_1^i) \quad (4)$$

$$\beta(t, m, i) = P(Z_{t+1}^n = y_{i+1}^L \mid S_t = m) \quad (5)$$

In equation (4), $\alpha(t,m,i)$ is the probability that the state at time t (or, the $t_{th}$ column in the trellis) is m, and that the first t inputs $x_1^t$ gave rise to the first i outputs $y_1^i$. In equation (5) $\beta(t,m,i)$ is the probability of receiving $y_{i+1}, , y_{i+2}, y_L$, after time t, given that at time t the state is m, and $y_1, y_2, ,y_i$ have been received. We also define the following function:

$$\gamma(t, m, m', i) = \begin{cases} P(S_t = m'; Z_t = y_i \mid S_{t-1} = m) & \text{if } m' \in B\times\{(\bullet, q)\} \\ P(S_t = m'; Z_t = y_{i-1}^i \mid S_{t-1} = m) & \text{if } m' \in B\times\{(1, Q)\} \\ P(S_t = m'; Z_t = \emptyset \mid S_{t-1} = m) & \text{if } m' \in B\times\{(\bullet, \bullet)\} \end{cases} \quad (6)$$

$q=1,2,\ldots,Q$. If we know the a priori statistics of the Markov source and timing uncertainty, as well as the statistics of the channel noise, it will be straightforward to calculate the above branch metrics $\gamma(t,m,m',i)$, which in an example system that receives samples from a magnetic storage medium with white Gaussian noise, are representative of the error of a sampling clock multiplied by the appropriate value of a Gaussian probability density function. The a priori statistics are generally assumed to be known, or can be determined in advance for a specific system. For example, they would be known from prior measurements of the recording system. Typically, the values γ(t,m,m',i) can be obtained from a lookup table once the received samples are known.

With these definitions, we can rewrite the soft-output function as follows:

$$\lambda_t(m) = \sum_{i=1}^{L} P(S_t = m; Z_1^t = y_1^i) P(Z_{t+1}^n = y_{i+1}^L \mid S_t = m) \quad (7)$$

$$= \sum_{i=1}^{L} \alpha(t, m, i) \beta(t, m, i),$$

$$\sigma_i(\psi) = \sum_{\substack{t,m \in B \times \{(\bullet,q)\} \\ (t-i)T + qT/Q = \psi}} \alpha(t, m, i) \beta(t, m, i) + \quad (8)$$

$$\sum_{\substack{t,m \in B \times \{(1,Q)\} \\ (t-i)T + T = \psi}} \alpha(t, m, i) \beta(t, m, i) +$$

$$\sum_{\substack{t,m \in B \times \{(1,Q)\} \\ (t-i)T + T/Q = \psi}} \alpha(t, m, i+1) \beta(t, m, i+1).$$

Equations (7), (8) indicate that the soft-outputs can be calculated in terms of α(t,m,i), and β(t,m,i). Next, we will show how to design a receiver that recursively calculates these two functions. To calculate α(t,m,i), first let α'(t,m,i) be:

$$\alpha'(t, m, i) = \begin{cases} \sum_{m' \in F} P(S_{t-1} = m'; Z_1^{t-1} = y_1^{i-1}; Z_t = y_i; S_t = m) \\ \text{if } m \in B \times \{(\bullet, q)\} \\ \sum_{m' \in F} P(S_{t-1} = m'; Z_1^{t-1} = y_1^{i}; Z_t = \emptyset; S_t = m) \\ \text{if } m \in B \times \{(\bullet, \bullet)\} \\ \sum_{m' \in F} P(S_{t-1} = m'; Z_1^{t-1} = y_1^{i-2}; Z_t = y_{i-1}^{t}; S_t = m) \\ \text{if } m \in B \times \{(1, Q)\} \end{cases} \quad (9a)$$

$$= \begin{cases} \sum_{m' \in F} \alpha(t-1, m', i-1) \gamma(t, m', m, i) \\ \text{if } m \in B \times \{(\bullet, q)\} \\ \sum_{m' \in F} \alpha(t-1, m', i) \gamma(t, m', m, i) \\ \text{if } m \in B \times \{(\bullet, \bullet)\} \\ \sum_{m' \in F} \alpha(t-1, m', i-2) \gamma(t, m', m, i-1) \\ \text{if } m \in B \times \{(1, Q)\}, \end{cases}$$

From (9a), we can recursively calculate α'(t,m,i), provided that α(t−1,m,i) is known for all m and i.

Normally, in order to keep in the precision of our system, we need to obtain normalized values of α(t,m,i), so that they add up to one at any t, for example using:

$$\alpha(t, m, i) = \alpha'(t, m, i) \Big/ \sum_{m',i'} \alpha'(t, m', i') \quad (9b)$$

We now need the initial conditions. We actually have the freedom to choose the initial statistics depending on the real systems. For example, we can assume that the intersymbol interference state stays at (−1,−1) before the transmission of real data, and we can have a priori statistics of initial sampling phase offset. If we assume the sampling clock starts sampling from the "0" phase offset, we will have the following initial conditions:

$$\alpha(1, m, i) = \quad (10)$$

$$\begin{cases} \gamma(1, m_0, m, 1), & \text{if } m \in \{(-1, \pm 1)\} \times \{(\bullet, Q-1), (\bullet, Q)\}; \\ \gamma(1, m_0, m, 0), & \text{if } m \in \{(-1, \pm 1)\} \times \{(\bullet, \bullet)\} \\ 0, & \text{otherwise.} \end{cases}$$

where $m_0 = (-1,-1) \times (\bullet, Q) = (-1,-1,(\bullet,Q))$. Other initial conditions can be assumed depending on the prior information we have.

Similarly, for t=1, 2, ..., n−1, we can calculate β'(t,m,i) by first finding β'(t,m,i) using the following equations:

$$\beta'(t, m, i) = \begin{cases} \sum_{m' \in B \times \{(\bullet,d)\}} P(S_{t+1} = m'; Z_{t+1} = y_{i+1}; \\ Z_{t+2}^n = y_{i+2}^L \mid S_t = m) + \\ \sum_{m' \in B \times \{(\bullet,\bullet)\}} P(S_{t+1} = m'; Z_{t+1} = \emptyset; \\ Z_{t+2}^n = y_{i+1}^L \mid S_t = m) + \\ \sum_{m' \in B \times \{(1,D)\}} P(S_{t+1} = m'; Z_{t+1} = y_{i+1}^{i+2}; \\ Z_{t+2}^n = y_{i+3}^L \mid S_t = m); \end{cases} \quad (11a)$$

$$= \begin{cases} \sum_{m' \in B \times \{(\bullet,d)\}} \gamma(t+1, m, m', i+1) \beta(t+1, m', i+1) + \\ \sum_{m' \in B \times \{(\bullet,\bullet)\}} \gamma(t+1, m, m', i) \beta(t+1, m', i) + \\ \sum_{m' \in B \times \{(1,D)\}} \gamma(t+1, m, m', i+2) \beta(t+1, m', i+2) \end{cases}$$

β'(t,m,i) can be normalized using the equation:

$$\beta(t, m, i) = \beta'(t, m, i) \Big/ \left( \sum_{m',i'} \beta'(t, m', i') \right) \quad (11b)$$

To calculate β(t,m,i) using the backward recursion in (11), we need the initial conditions at t=n:

$$\beta(n, m, i) = \begin{cases} 1, i = L; \\ 0, \text{otherwise.} \end{cases} \quad (12)$$

Notice that the above initial condition assumes that we know the "exact" value, L, of the number of received samples corresponding to n transmitted symbols. If in the real system, the length of the received sequence is not precisely known (say, we don't know which specific sampling corresponds to the last symbol in a block), we can simply modify the initial conditions by using the a priori statistics of the length L.

Thus the soft-output algorithm for channels with deletion/insertion errors includes the following steps:

Step 1: Set the initial conditions of $\alpha(t,m,i)$ and $\beta(t,m,i)$ according to equations (10) and (12).

Step 2: When the sequence $y_1^L$ has been received, calculate $\alpha(t,m,i)$ using the forward recursion (9) and $\beta(t,m,i)$ using the backward recursion equation (11). All these values are stored. The values $\gamma(t,m',m,i)$ are calculated whenever needed using equation (6) or simply from a look-up table.

Step 3: Calculate the soft-outputs using equation (7).

Step 4: Perform MAP detection using equation (3).

Similar to the Bahl, Cocke, Jelinick, Raviv (BCJR) algorithm, the algorithm used in this invention is a forward-backward recursion process. One major difference from the standard BCJR algorithm is that $\alpha(t,m,i)$ cannot be computed while the sequence $Y_1^L$ is being received. We must wait until the whole sequence has been received to start calculation of $\alpha(2,m,i)$ for all m and i=1, 2 ..., L. However, this problem is easily solved by a slight modification to the above algorithm, as discussed below.

Since the computation of $\gamma(t,m',m,i)$ involves a lookup table, which is simple, we do not need to determine these values for each subsequent calculation, but rather look them up whenever needed.

Figure 5:
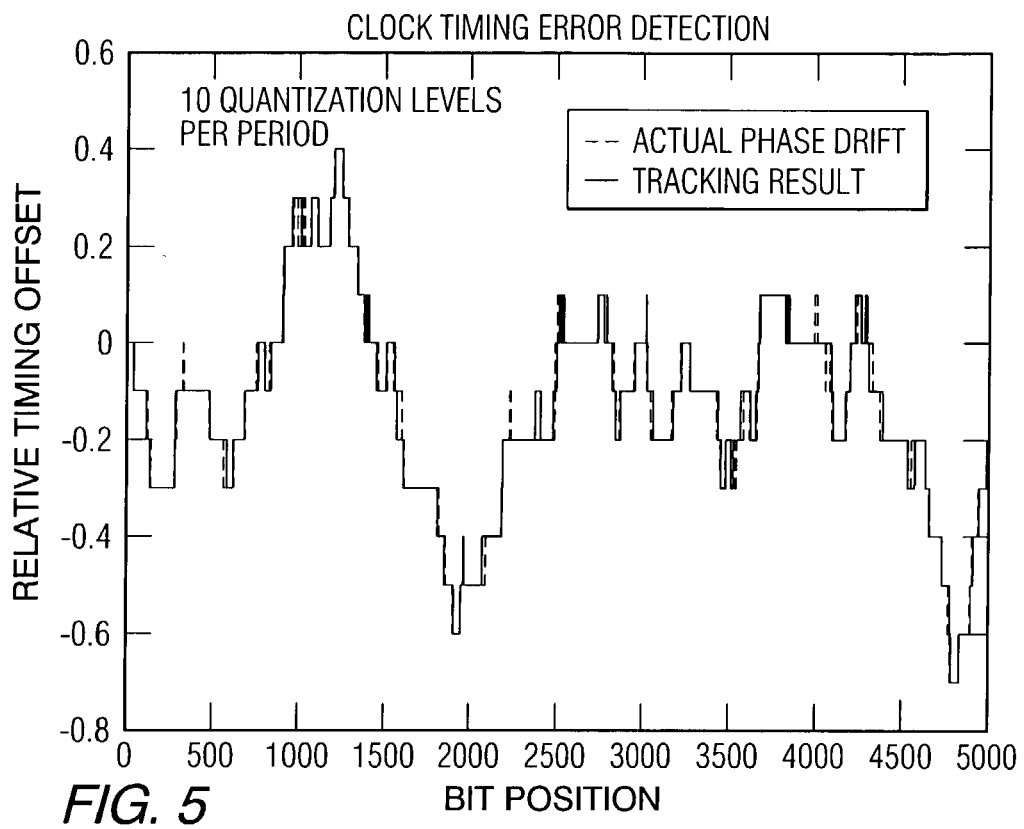
FIGS. 5 and 6 are graphs showing results of tracking the relative timing offset vs. bit position.
Figure 6:
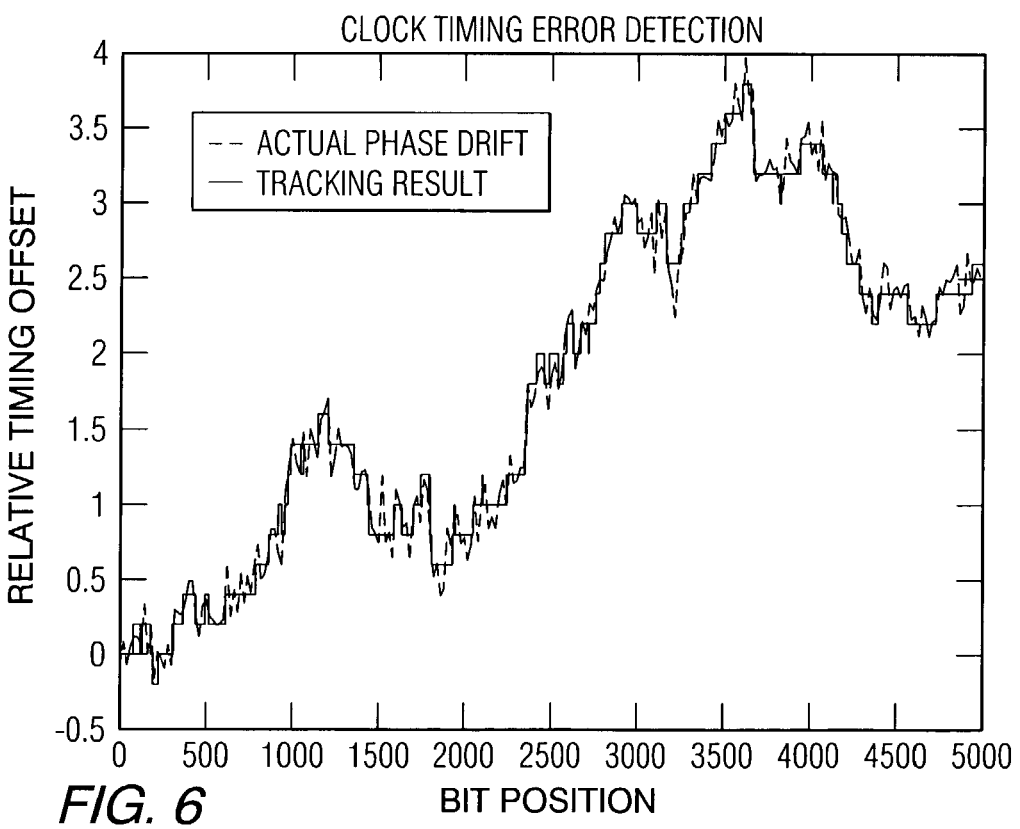

FIG. 5 and FIG. 6 demonstrate the phase tracking results of the soft output algorithm when the phase drift is quantized to 10 and 5 levels per sampling period respectively, implemented using equations (8) and (3b). In FIGS. 5 and 6, the broken line plots the actual random phase offset, and the solid line plots the tracking result. In FIG. 5 the random phase change is generated by a discrete Brownian process with $\delta=0.01$. That is, the sampling phase in the next period will drift to the adjacent phase level with probability 0.01. In FIG. 6 the random phase changes are generated by a 'random walk' Gaussian process, and are still tracked by our discrete quantized phase offset model. For each case, we transmit 5000 bits from a uniform binary source, and pass them through the intersymbol interference (ISI) channel mentioned above. The curves in FIGS. 5 and 6 show that our algorithm can satisfactorily track the sampling phase drift of the clock. In both cases, all the information bits are decoded without any error, although we notice that in FIG. 6, the phase drift may be as large as 3 periods, which means we've deleted 3 symbols at the receiver side.

Figure 7:
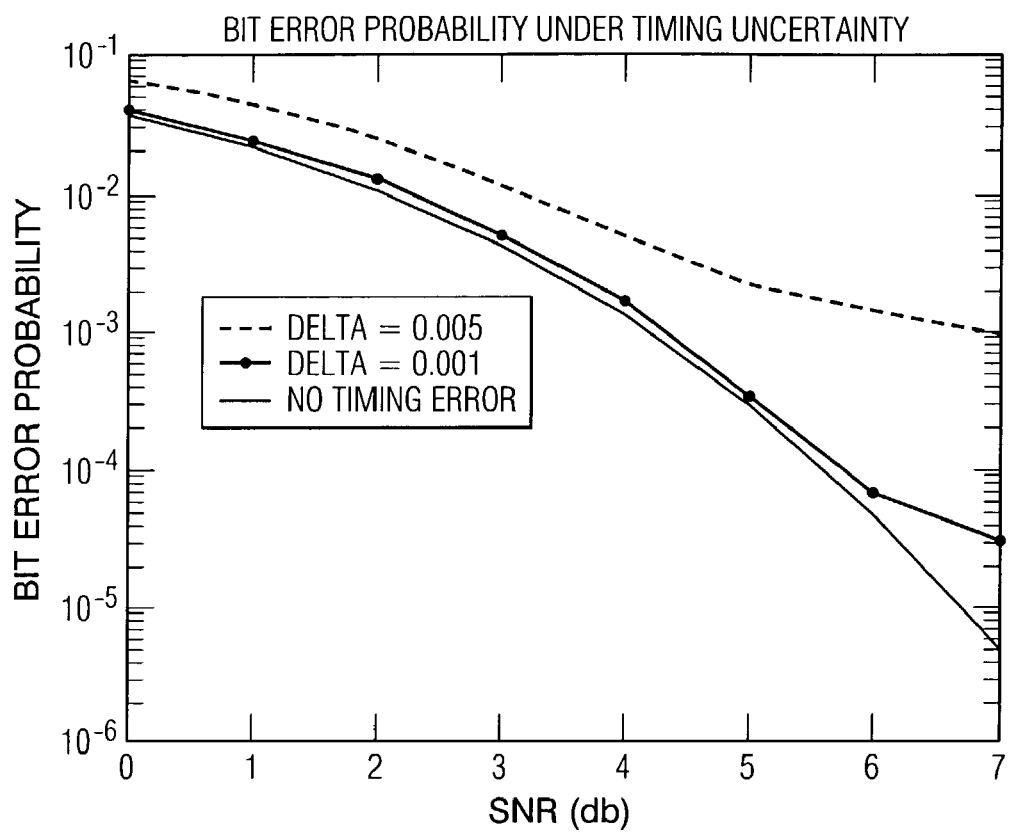
FIG. 7 is a graph of achieved bit error probability vs. signal to noise ratio.

FIG. 7 compares the average bit error probability by the soft output algorithm under different timing error probabilities.

As mentioned above, the algorithm described by equations (9a) through (11b) will not start until the whole sequence $Y_1^L$ has been received. Because the calculation of $\alpha$ for all m and i at time t will use the values $\alpha$ for all i=1, 2, ..., L at time t−1, this will cause significant delay if the codeword is long. However, if we examine equation (9a) carefully, we will notice that this can be avoided by changing the order of computation. The recursion of $\alpha$ could go along the variable i, instead of t, i.e., when the symbol $y_i$ is received, we could fix i and calculate $\alpha(t,m,i)$ for all m∈F and t=1, 2, ..., n. These values can be used for the computation of $\alpha(t,m,i+1)$ after receiving $y_{i+1}$. Thus we don't need to wait until the complete sequence has been received to start the calculation.

Another problem related to the soft-output algorithm is the amount of memory needed in the computation. All the values of $\alpha(t,m,i)$ must be stored, which account for the bulk of the memory required to implement the algorithm. In the original BCJR algorithm, the amount of memory required for the storage of $\alpha_t(m)$ grows linearly with block length n and linearly with the number of states in the trellis. Here, in our algorithm, the amount of memory also grows linearly with L, where L is the length of the received sequence. Since the length of the received sequence is comparable to the length of the transmitted sequence, this algorithm requires much larger storage, that is, quadratically proportional to the sequence length n. For example, suppose we have $n=10^4$ symbols in the sequence, and we have only 28 states at each time instant in the trellis, then we need to store about $28 \cdot 10^8$ values of $\alpha(\bullet,\bullet,\bullet)$.

Practically, however, it is not necessary to search backward until i=1 for deletions, or search forward until i=L for insertions. This is because in real systems, the probability of insertion or deletion is very small, say, 0.05%, and for a fixed t we have that $\alpha(t,m,i)$ (or ) $\beta(t,m,i))$ is 0 for most values of i. Thus, we may use a sub-optimal algorithm to reduce the amount of storage by searching only in a neighborhood of t. For example, we can define a "window size" w. At each time t, we only calculate $\alpha(t,m,i)$ for $t-w \leq i \leq t+w$, and assume $\alpha(t,m,i)=0$ for other values of i. In this way the number of $\alpha\alpha$values we need to store is vastly reduced.

In this context, 'windowing' means that instead of storing the whole matrix, we store only a window of the matrix. The window is centered around t. As t goes to t+1, the window slides. This is illustrated in FIGS. 9–14, discussed below, wherein the shaded areas in the matrices are zeros, so they do not need to be stored. This reduces the memory requirement in the system.

When we practically implement the soft-output algorithm, or simulate it on a computer, we may encounter the precision problem. That is, when the trellis (or the sequence) is long, say $n>10^3$, the values of $\alpha(t,m,i)$ may become too small to be handled by the precision of practical computers, as the forward recursion proceeds with t. We can solve this problem by normalizing all the $\alpha(\bullet, \bullet, \bullet)$ values at time t, so that they add up to 1 after normalization. This is illustrated by equation (9b). We use the similar procedure for all the $\beta(\bullet, \bullet, \bullet)$ values as well (equation (11b)). By normalizing the $\alpha$ and $\beta$ values, they will not become too small as the recursions progress. On the other hand, since all the $\alpha$ (as well as $\beta$) values at time t are normalized by the same factor, the only change to $\lambda_t(m)$ at t is that they are multiplied by the same constant. This will not influence any input symbol decision based on the soft-outputs.

However, when we estimate the timing offset $\phi_i(\psi)$ of the $i_{th}$ sampling, we may need to add up the $\alpha(\bullet, \bullet, \bullet)$ (or $\beta$) values at different time t, as is shown in equation (8). This will require us to consider the normalizing coefficients at the different columns of the trellis.

Figure 8:
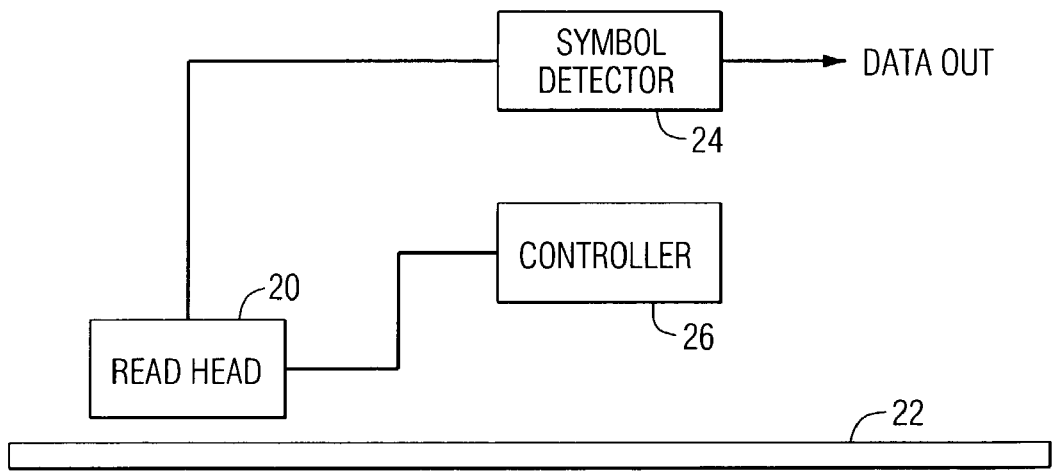
FIG. 8 is a simplified block diagram of a portion of a read back portion of a magnetic disc drive.

This invention can be used in the decoding of bits read from a data storage device such as a disc drive. FIG. 8 is a functional block diagram of a portion of disc drive system that can utilize the invention. The disc drive includes a read head 20 that is positioned adjacent to the surface of a storage medium 22, comprising, for example magnetic or optical storage media. The read head is controlled by a controller to produce output signals in the form electric pulses. The pulses are delivered to a detector 24 that uses the method of this invention to determine the information bits represented by the pulse to produce output data. The detector can include one or more processors that perform the steps of the method of the invention.

Figure 9:
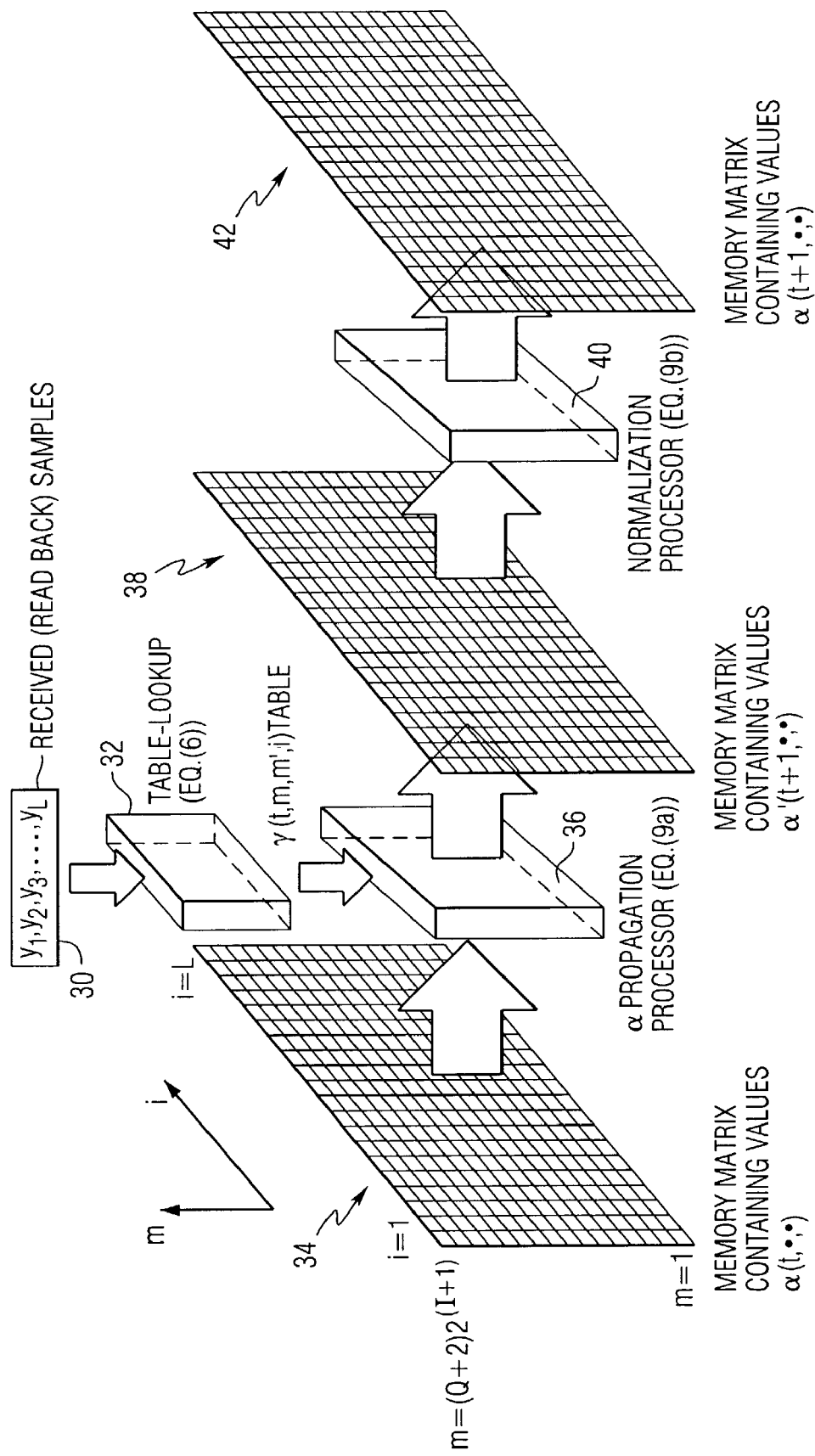
FIG. 9 is a schematic representation of an apparatus for performing the forward calculation used in the method of this invention.

FIG. 9 is a schematic representation of the components used to perform the forward calculations in the method of this invention. Received samples illustrated in block 30 enter a look-up table 32. The outputs of the look-up table are the branch metrics $\gamma(t,m,m',i)$, which can also be calculated using equation (6). A memory matrix 34 contains values α(t,●,●). The values from the memory matrix 34 and the branch metrics are used by an α propagation processor 36 to generate α'(t+1,●,●) values for a second memory matrix 38, in accordance with equation 9a. The values in memory matrix 38 are then normalized by a normalization processor 40 to produce α(t+1,●,●) values for a third memory matrix 42, in accordance with equation 9b. The values in the matrix 42 may be stored back in matrix 38 so as not to increase the memory requirement.

Figure 10:
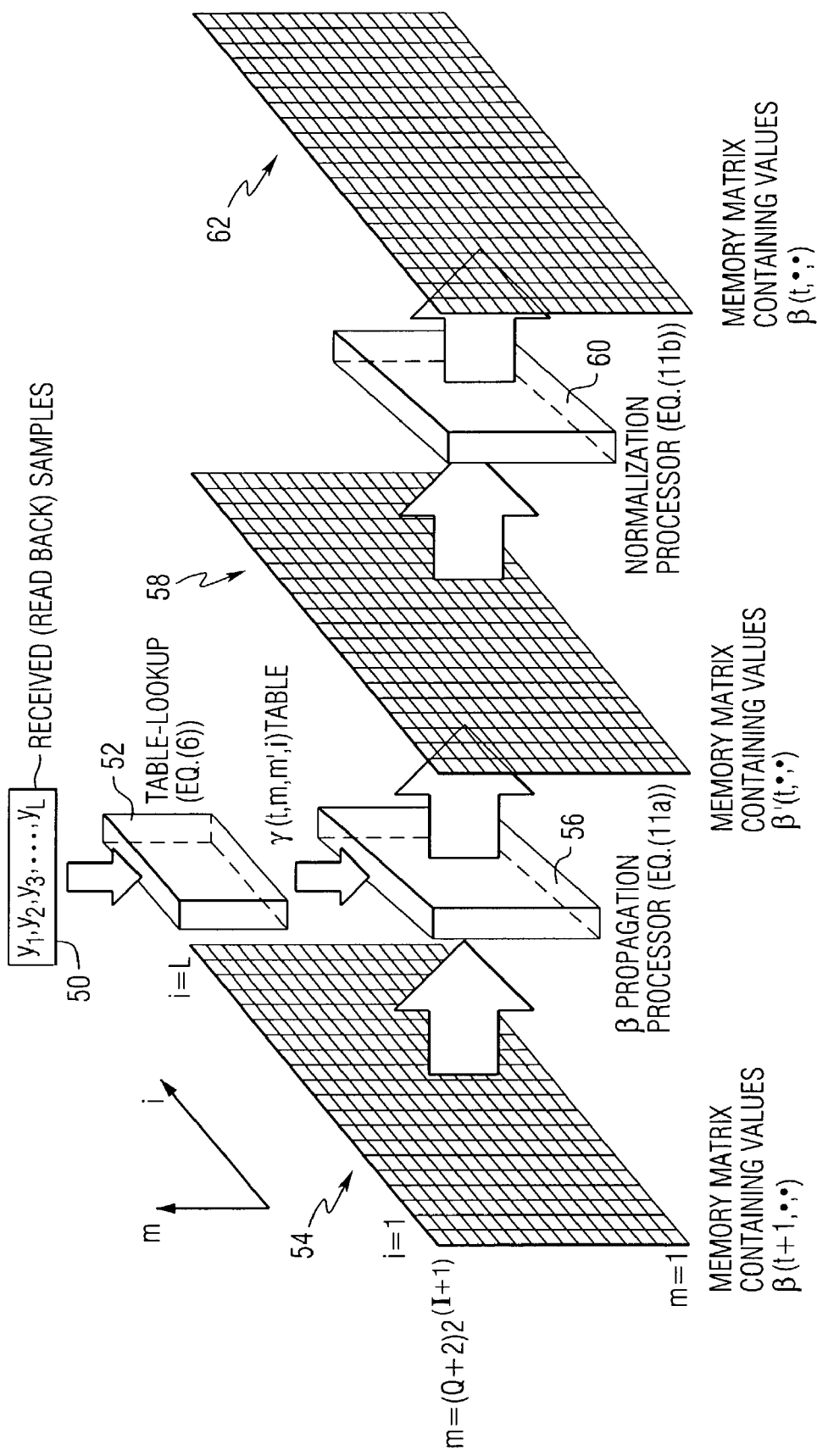
FIG. 10 is a schematic representation of an apparatus for performing the backward calculation used in the method of this invention.

FIG. 10 is a schematic representation of the components used to perform the backward calculations in the method of this invention. Received samples illustrated in block 50 enter a look-up table 52. The outputs of the look-up table are the branch metrics γ(t,m,m',i), which can also be calculated using equation (6). A memory matrix 54 contains values β(t+1,●,●). The values from the memory matrix 54 and the branch metrics are used by a β propagation processor 56 to generate β'(t,●,●) values for a second memory matrix 58, in accordance with equation (11a). The values in memory matrix 58 are then normalized by a normalization processor 60 to produce β(t,●,●) values for a third memory matrix 62, in accordance with equation (11b). The values in the matrix 62 may be stored back in matrix 58 so as not to increase the memory requirement.

Figure 11:
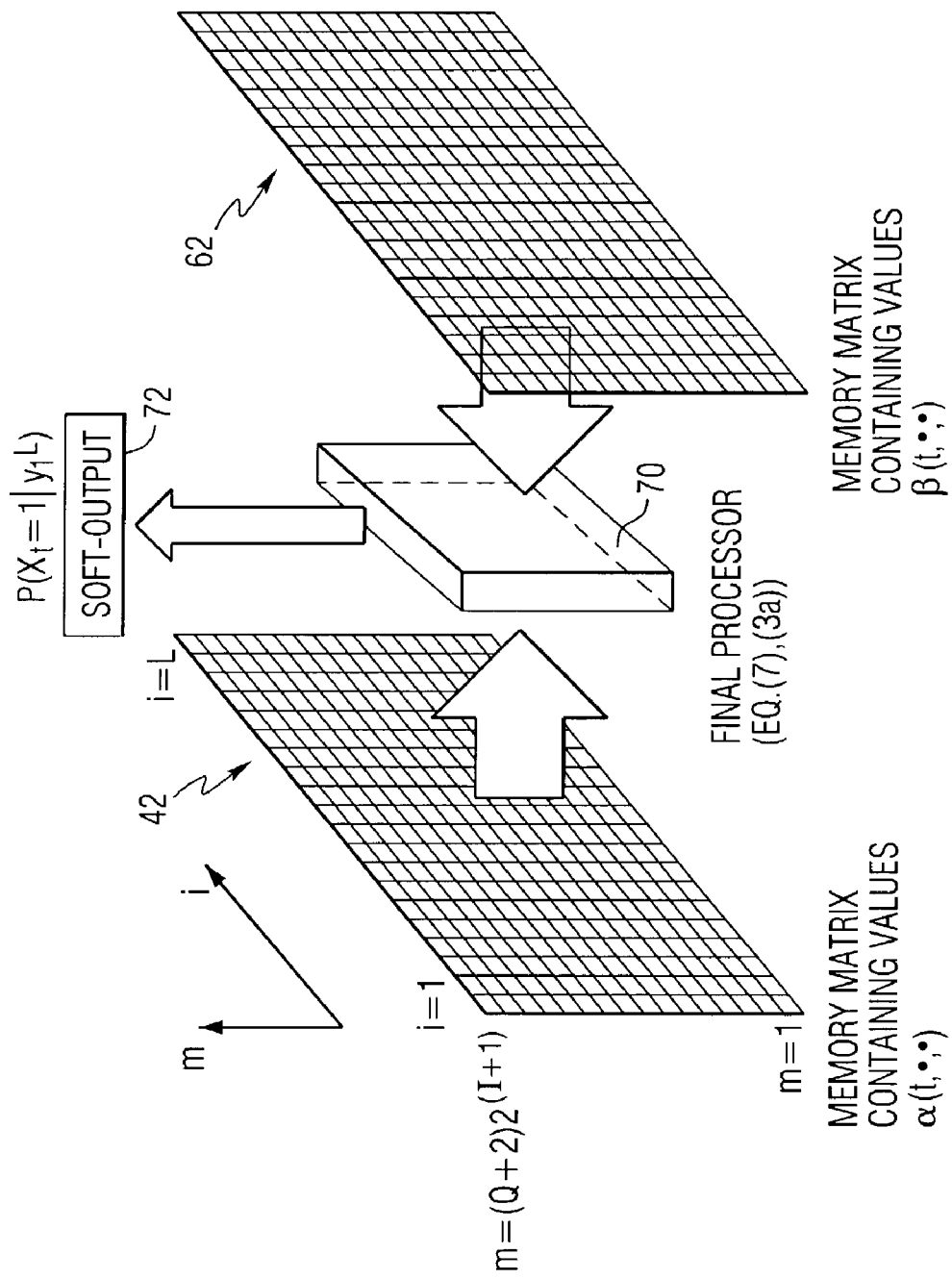
FIG. 11 is a schematic representation of an apparatus for performing the final calculation used in the method of this invention.

FIG. 11 is a schematic representation of the components used to perform the final calculations used to produce the soft output. A final processor 70 receives data from matrices 42 and 62 and uses equations (7) and (3a) to produce the soft output as illustrated by block 72. As evident from the equations, the processors only need to implement standard addition and multiplication operations.

Figure 12:
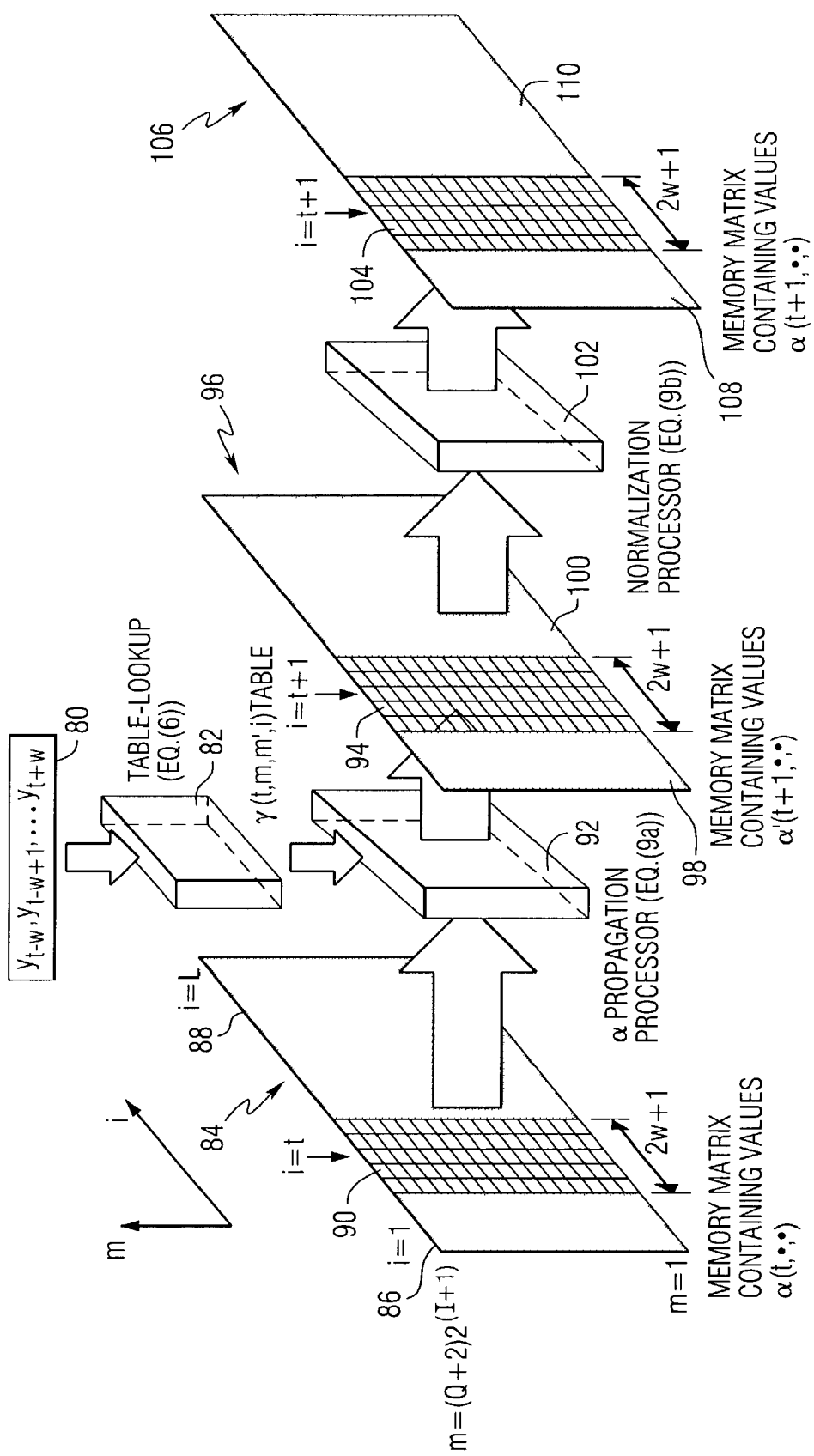
FIG. 12 is a schematic representation of an apparatus for performing the forward calculation used in the method of this invention with windowing.

FIG. 12 is a schematic representation of the components used to perform the forward calculations in the method of this invention with windowing. Received samples illustrated in block 80 enter a look-up table 82. The outputs of the look-up table are the branch metrics γ(t,m,m',i), which can also be calculated using equation (6). A memory matrix 84 contains values α(t,●,●). Since the memory matrix 84 includes many zero values, as illustrated by matrix portions 86 and 88, only the non-zero values in portion 90 of the matrix are used for subsequent calculations. The values from portion 90 of the memory matrix 84 and the branch metrics are used by an α propagation processor 92 to generate α'(t+1,●,●) values for a portion 94 of a second memory matrix 96, in accordance with equation (9a). The other portions 98 and 100 of memory matrix 96 contain zero values. The values in portion 94 of memory matrix 96 are then normalized by a normalization processor 102 to produce α(t+1,●,●) values for a portion 104 of a third memory matrix 106, in accordance with equation (9b). Note that the values in the matrix 106 may be stored back in matrix 96 so as not to increase the memory requirement Portions 108 and 110 of matrix 106 contain zero values, and thus are non-existent.

Figure 13:
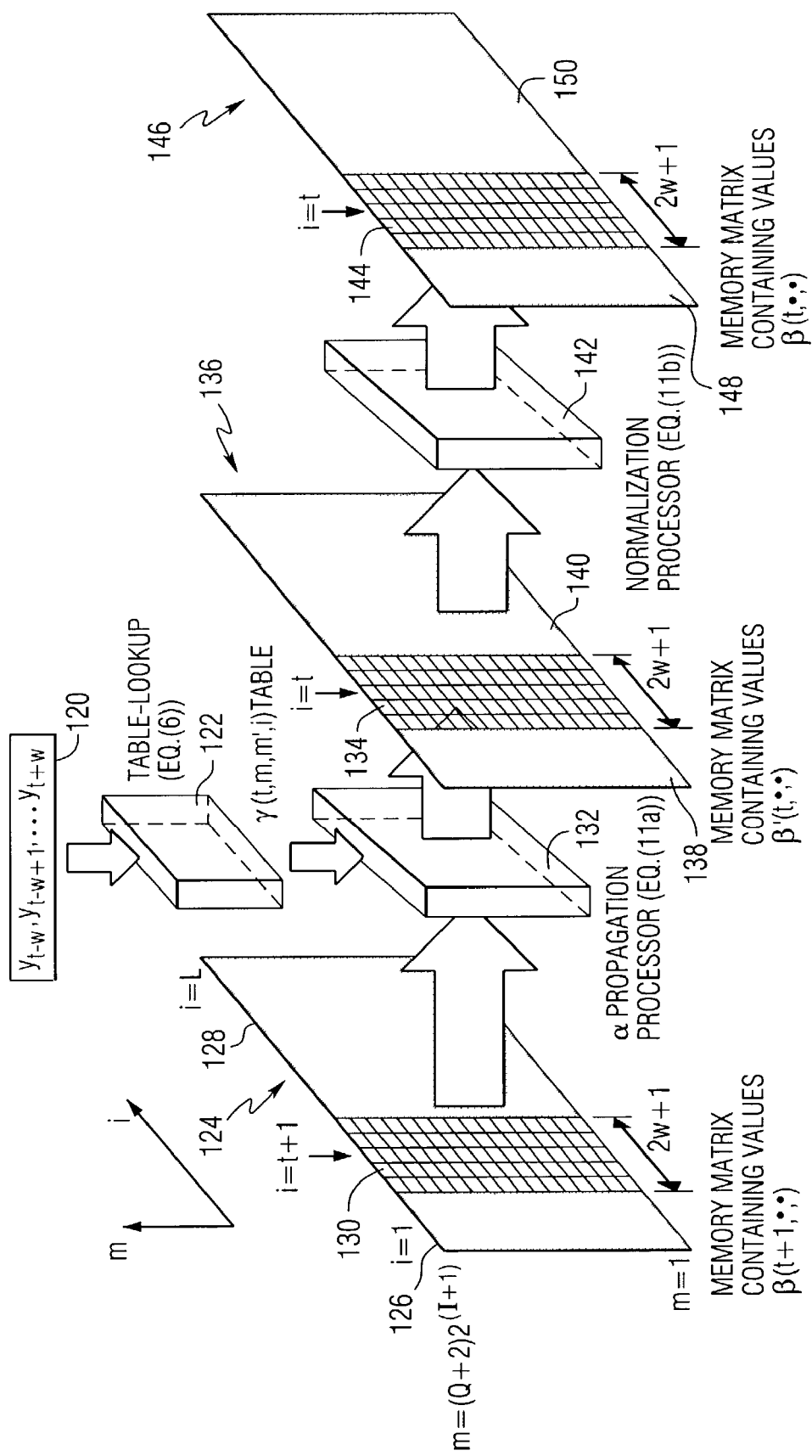
FIG. 13 is a schematic representation of an apparatus for performing the backward calculation used in the method of this invention with windowing.

FIG. 13 is a schematic representation of the components used to perform the backward calculations in the method of this invention with windowing. Received samples illustrated in block 120 enter a look-up table 122. The outputs of the look-up table are the branch metrics γ(t,m,m',i), which can also be calculated using equation (6). A memory matrix 124 contains values β(t+1,●,●). Since the memory matrix 124 includes many zero values, as illustrated by matrix portions 126 and 128, only the non-zero values in portion 130 of the matrix are used for subsequent calculations. The values from portion 130 of the memory matrix 124 and the branch metrics are used by a β propagation processor 132 to generate β'(t,●,●) values for a portion 134 of a second memory matrix 136, in accordance with equation (11a). The other portions 138 and 140 of memory matrix 136 contain zero values. The values in portion 134 of memory matrix 136 are then normalized by a normalization processor 142 to produce β(t,●,●) values for a portion 144 of a third memory matrix 146, in accordance with equation (11b). Note that the values in the matrix 146 may be stored back in matrix 136 so as not to increase the memory requirement. Portions 148 and 150 of matrix 146 contain zero values, and thus need not exist at all.

Figure 14:
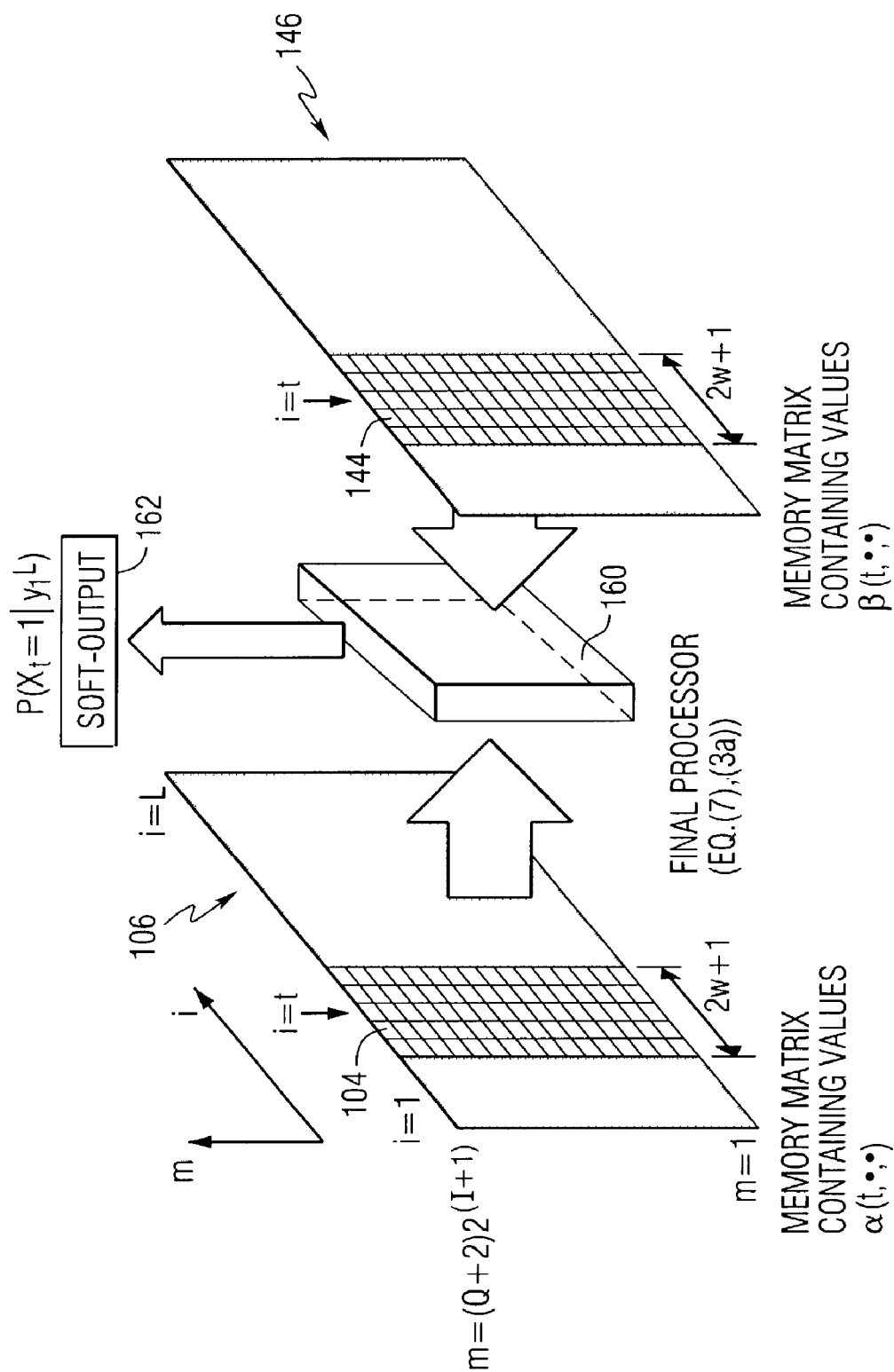
FIG. 14 is a schematic representation of an apparatus for performing the final calculation used in the method of this invention with windowing.

FIG. 14 is a schematic representation of the components used to perform the final calculations used to produce the soft output. A final processor 160 receives data from portion 104 of matrix 106, and portion 144 of matrix 146 and uses equations (7) and (3a) to produce the soft output as illustrated by block 162.

Figure 15:
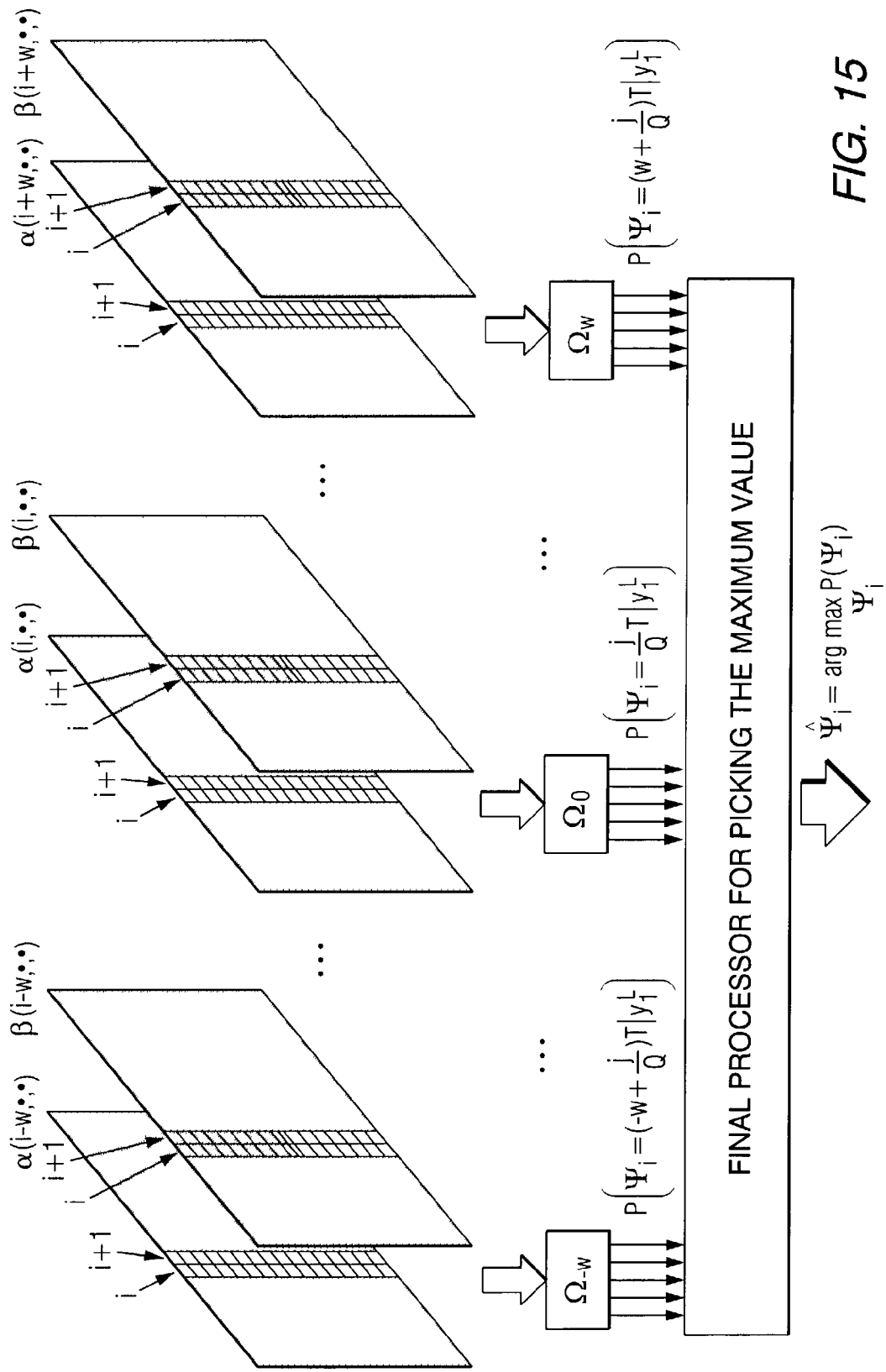
FIG. 15 is a schematic representation of an apparatus for estimating timing error of received data symbols.

FIG. 15 is a schematic representation of an apparatus for estimating timing error of received data symbols. From the computed α and β matrices, the processor $\Omega_k$ where $-w \leq k \leq w$, computes the probabilities that the values of the phase error for the i-th sample are:

$$\psi_i = \left(k + \frac{1}{Q}\right)T$$

$$\psi_i = \left(k + \frac{2}{Q}\right)T$$

$$\vdots$$

$$\psi_i = \left(k + \frac{Q}{Q}\right)T$$

The processors illustrated in FIG. 15 implement equations (8) and (3b). Thus only adders and multipliers are needed in the processors. The probabilities from all the processors $\Omega_k$, $-w \leq k \leq w$, are compared by the final processor, and the maximum is picked. The result of the phase error tracking is given in FIGS. 5 and 6.

The benefits of this invention are:

1) Resilience to timing errors, including cycle-slips.
2) If the joint symbol and timing detector is used, the Phase-Locked Loop (PLL) requirement can be loosened (or the PLL may be removed altogether).
3) Initial synchronization does not have to be perfect, which means that the synchronization preamble can be shortened, leading to a higher information rate in a communications channel (or a higher aerial density on a disk drive).
4) It is provably the best detector in the presence of timing uncertainty, so no other detector can do better.
5) Improved resilience to lower signal-to-noise ratio (SNR) since it is known that the timing errors become most pronounced at low SNRs.

While the invention has been described in terms of the detection of data symbols in disc drives, it will be apparent to those skilled in the art that the method and apparatus of this invention is applicable to other devices and systems where the data symbols can be subject to intersymbol interference and/or timing errors. In addition, it will also be apparent that changes can be made to the disclosed examples without departing from the scope of the invention as set forth in the following claims.

What is claimed is:

1. A method for detecting data symbols corrupted by intersymbol interference and timing error, comprising:
   calculating a first plurality of state probabilities for received symbols using a forward recursive process on a joint intersymbol interference/timing error (ISI/TE) trellis;
   calculating a second plurality of state probabilities for the received symbols using a backward recursive process on the joint ISI/TE trellis; and
   using the first plurality of state probabilities and the second plurality of state probabilities to calculate a posteriori state transition probabilities for the received symbols.

2. The method of claim 1, further comprising:
   windowing the first plurality of state probabilities; and
   windowing the second plurality of state probabilities.

3. The method of claim 1, further comprising:
   normalizing the first plurality of state probabilities; and
   normalizing the second plurality of state probabilities.

4. The method of claim 1, wherein the symbols are representative of data stored in a data storage medium.

5. The method of claim 1, further comprising:
   estimating the phase of the timing error of the data symbols using the first plurality of state probabilities and the second plurality of state probabilities.

6. An apparatus for detecting data symbols corrupted by intersymbol interference and timing error, comprising:
   means for calculating a first plurality of state probabilities for received symbols using a forward recursive process on a joint intersymbol interference/timing error (ISI/TE) trellis;
   means for calculating a second plurality of state probabilities for the received symbols using a backward recursive process on the joint ISI/TE trellis; and
   means for using the first plurality of state probabilities and the second plurality of state probabilities to calculate a posteriori state transition probabilities for the received symbols.

7. The apparatus of claim 6, further comprising:
   means for windowing the first plurality of state probabilities; and
   means for windowing the second plurality of state probabilities.

8. The apparatus of claim 6, further comprising:
   means for normalizing the first plurality of state probabilities; and
   means for normalizing the second plurality of state probabilities.

9. The apparatus of claim 6, wherein the symbols are representative of data stored in a data storage medium.

10. The apparatus of claim 6, further comprising:
    means for estimating the phase of the timing error of the data symbols using the first plurality of state probabilities and the second plurality of state probabilities.

11. A detector for detecting data symbols corrupted by intersymbol interference and timing error, comprising:
    a forward state probability processor for calculating a first plurality of state probabilities for received symbols using a forward recursive process on a joint intersymbol interference/timing error (ISI/TE) trellis;
    a backward state probability processor for calculating a second plurality of state probabilities for the received symbols using a backward recursive process on the joint ISI/TE trellis; and
    an a posteriori state transition processor for calculating a posteriori state transition probabilities for the received symbols using the first plurality of state probabilities and the second plurality of state probabilities to calculate a posteriori state transition probabilities for the received symbols.

12. A method of detecting received symbols represented by a trellis, comprising:
    defining a joint intersymbol interference/timing error (ISI/TE) trellis representative of intersymbol interference and timing errors of the received symbols;
    calculating a set of forward recursion state metrics for a portion of the joint ISI/TE trellis using a forward recursive process;
    calculating a set of backward recursion state metrics for the portion of the joint ISP/TE trellis using a backward recursive process;
    calculating soft outputs for the portion of the joint ISI/TE trellis using the forward recursion state metrics and the backward recursion state metrics; and
    outputting the soft outputs.

13. The method of claim 12, further comprising:
    windowing the set of forward recursion state metrics; and
    windowing the set of backward recursion state metrics.

14. The method of claim 12, further comprising:
    normalizing the set of forward recursion state metrics; and
    normalizing the set of backward recursion state metrics.

15. The method of claim 12, wherein the symbols are representative of data stored in a data storage medium.

16. The method of claim 12, further comprising:
    estimating the phase of the timing error of the received symbols using the first plurality of state probabilities and the second plurality of state probabilities.

17. An apparatus for detecting received symbols represented by a trellis, comprising:
    means for computing branch metrics for a joint intersymbol interference/timing error (ISI/TE) trellis representative of intersymbol interference and timing errors of the received symbols;
    means for calculating a set of forward recursion state metrics for a portion of the joint ISI/TE trellis using the branch metrics for the joint ISI/TE trellis in a forward recursive process;
    means for calculating a set of backward recursion state metrics for the portion of the joint ISI/TE trellis using the branch metrics for the joint ISI/TE trellis in a backward recursive process;
    means for calculating soft outputs for the portion of the ISI/TE trellis using the forward recursion state metrics and the backward recursion state metrics; and
    means for outputting the soft outputs.

18. The apparatus of claim 17, further comprising:
    means for windowing the set of forward recursion state metrics; and
    means for windowing the set of backward recursion state metrics.

19. The apparatus of claim 17, further comprising:
    means for normalizing the set of forward recursion state metrics; and
    means for normalizing the set of backward recursion state metrics.

20. The apparatus of claim 17, further comprising:
    means for estimating the phase of the timing error of the received symbols using the first plurality of state probabilities and the second plurality of state probabilities.

21. An apparatus for detecting received symbols represented by a trellis, comprising:
    a look-up table defined by a joint intersymbol interference/timing error (ISI/TE) trellis, the look-up table having inputs for receiving the symbols and having outputs representative of the joint ISI/TE trellis branch metrics;

a first processor for calculating a set of forward recursion state metrics for a portion of the joint ISI/TE trellis in a forward recursion, wherein inputs to the first processor are forward recursion state metrics and the joint ISI/TE trellis branch metrics;

a second processor for calculating a set of backward recursion state metrics for the portion of the joint ISI/TE trellis in a backward recursion, wherein inputs to the second processor are backward recursion state metrics and the joint ISI/TE trellis branch metrics; and a third processor for calculating soft outputs for the portion of the ISI/TE trellis using the forward recursion state metrics and the backward recursion state metrics, and for outputting the soft outputs.

22. A method of detecting received symbols represented by a trellis, comprising:

defining a joint intersymbol interference/timing error (ISI/TE) trellis representative of intersymbol interference and timing errors of the received symbols;

calculating a set of forward recursion state metrics for a portion of the joint ISI/TE trellis in a forward recursion, using forward recursion state metrics and the joint ISI/TE trellis branch metrics;

calculating a set of backward recursion state metrics for the portion of the joint ISI/TE trellis in a backward recursion starting from an end state determined from the forward recursion, the backward recursion starting from the end state and moving to the beginning of the portion of the joint ISI/TE trellis;

wherein a respective alpha probability is calculated for each possible state at the end stage of the forward recursion through the portion, each alpha being the respective metric for a respective state accumulated starting at the initial state of the portion of the ISI/TE trellis and ending at the respective state at the end of the forward recursion, and wherein a respective beta probability is calculated for each possible state at the end stage of the backward recursion through the portion, each beta being the respective metric for a respective state accumulated starting at the end state of the portion of the joint ISI/TE trellis and ending at the respective state at the start of the forward recursion;

calculating soft outputs for the portion of the joint ISI/TE trellis using the alpha and beta probabilities; and outputting the soft output for the portion of the joint ISI/TE trellis.

23. The method of claim 22, wherein the symbols are representative of data stored in a data storage medium.

24. The method of claim 22, further comprising:

estimating the phase of the timing error of the received symbols using the first plurality of state probabilities and the second plurality of state probabilities.

25. An apparatus for detecting received symbols represented by a trellis, comprising:

means for defining a joint intersymbol interference/timing error (ISI/TE) trellis representative of intersymbol interference and timing errors of the received symbols;

means for calculating a set of forward recursion state metrics for a portion of the joint ISI/TE trellis in a forward recursion, using forward recursion state metrics and the joint ISI/TE trellis branch metrics;

means for calculating a set of backward recursion state metrics for the portion of the joint ISI/TE trellis in a backward recursion starting from an end state determined from the forward recursion, the backward recursion starting from the end state and moving to the beginning of the portion of the joint ISI/TE trellis;

wherein a respective alpha probability is calculated for each possible state at the end stage of the forward recursion through the portion, each alpha being the respective metric for a respective state accumulated starting at the initial state of the portion of the ISI/TE trellis and ending at the respective state at the end of the forward recursion, and wherein a respective beta probability is calculated for each possible state at the end stage of the backward recursion through the portion, each beta being the respective metric for a respective state accumulated starting at the end state of the portion of the joint ISI/TE trellis and ending at the respective state at the start of the forward recursion; and means for calculating soft outputs for the portion of the joint ISI/TE trellis using the alpha and beta probabilities, and for outputting the soft output for the portion of the joint ISI/TE trellis.

26. The apparatus of claim 25, further comprising:

means for estimating the phase of the timing error of the received symbols using the first plurality of state probabilities and the second plurality of state probabilities.

27. An apparatus for detecting received symbols represented by a trellis, comprising:

a look-up table defined by a joint intersymbol interference/timing error (ISI/TE) trellis, the look-up table having inputs for receiving the symbols and having outputs representative of the joint ISI/TE trellis branch metrics;

a first processor for calculating a set of forward recursion state metrics for a portion of the joint ISI/TE trellis in a forward recursion, wherein inputs to the first processor are forward recursion state metrics and the joint ISI/TE trellis branch metrics;

a second processor for calculating a set of backward recursion state metrics for the portion of the joint ISI/TE trellis in a backward recursion, wherein inputs to the second processor are backward recursion state metrics and the joint ISI/TE trellis branch metrics;

wherein a respective alpha probability is calculated for each possible state at the end stage of the forward recursion through the portion, each alpha being the respective metric for a respective state accumulated starting at the initial state of the portion of the ISI/TE trellis and ending at the respective state at the end of the forward recursion, and wherein a respective beta probability is calculated for each possible state at the end stage of the backward recursion through the portion, each beta being the respective metric for a respective state accumulated starting at the end state of the portion of the joint ISI/TE trellis and ending at the respective state at the start of the forward recursion; and a third processor for calculating soft outputs for the portion of the ISI/TE trellis using the alpha and beta probabilities and for outputting the soft output for the portion of the joint ISI/TE trellis.

28. The apparatus of claim 27, further comprising:

means for estimating the phase of the timing error of the received symbols using the first plurality of state probabilities and the second plurality of state probabilities.

29. The apparatus of claim 27, further comprising:

a plurality of additional processors for calculating probabilities of values of phase error for the received samples using the first plurality of state probabilities and the second plurality of state probabilities; and a final processor for selecting a maximum probability from the plurality of additional processors.

* * * * *

UNITED STATES PATENT AND TRADEMARK OFFICE
CERTIFICATE OF CORRECTION

PATENT NO. : 7,154,965 B2
APPLICATION NO. : 10/266241
DATED : December 26, 2006
INVENTOR(S) : Wei Zeng et al.

It is certified that error appears in the above-identified patent and that said Letters Patent is hereby corrected as shown below:

On the title page Item [56] Other Publications

"A. Kavčié et al.," should read -- A. Kavčič et al., --

Column 5, Line 5
"...final trellis will have $2^{(I+1)}$..." should read --...final trellis will have $2^{(I+1)}$...-- ("I" should not be italicized)

Column 5, Line 31
"...a posteriori probability..." should read --...*a posteriori probability*...-- (italicized)

Column 6, Line 1
"... a posteriori..." should read --...*a posteriori*...-- (italicized)

Column 6, Line 47
"... $y_{i+1}$, , $y_{i+2}$, $y_L$, ..." should read --... $y_{i+1}$, $y_{i+2}$,... $y_L$,...-- (delete comma, add ellipsis)

Column 6, Line 48
"...$y_1$, $y_2$, ,$y_i$ ..." should read --...$y_1$, $y_2$, ..., $y_i$ ...-- (add ellipsis)

Column 6, Line 57
"...a priori..." should read --...*a priori*...-- (italicized)

Column 6, Line 64
"...a priori..." should read --...*a priori*...-- (italicized)

Column 7, Line 38
(Equation (9a))
"...=$y^t_{i-1}$;..." should read --...=$y^i_{i=1}$;...-- (t should be i)

Column 8, Line 2
"...a priori..." should read --...*a priori*... -- (italicized)

Column 8, Line 66
"...a priori..." should read --...*a priori*...-- (italicized)

Column 10, Line 15
"...that α(t,m,i) (or) β(t,m,i)) is 0..." should read --...that α(t,m,i) (or β(t,m,i)) is 0...-- (delete parenthesis)

UNITED STATES PATENT AND TRADEMARK OFFICE
CERTIFICATE OF CORRECTION

PATENT NO. : 7,154,965 B2
APPLICATION NO. : 10/266241
DATED : December 26, 2006
INVENTOR(S) : Wei Zeng et al.

It is certified that error appears in the above-identified patent and that said Letters Patent is hereby corrected as shown below:

Column 10, Line 16
"...sub-optimal..." should be --...*sub-optimal*...-- (italicized)

Column 10, Line 21
"... ααvalues..." should read --...α values...--

Column 10, Line 30
"...the precision..." should read --...the *precision*...-- (italicized)

Column 11, Line 2
"...matrix 34..." should read --...matrix 34...-- (bold)

Column 11, Line 44
"...an a propagation..." should read --...an α propagation...--

Column 11, Line 59
"...table 122." should read --...table 122."-- (bold)

Claim 12 (Column 14, Line 14)
"...ISP/TE..." should read --...ISI/TE...--

Signed and Sealed this

Twenty-fifth Day of December, 2007

JON W. DUDAS
*Director of the United States Patent and Trademark Office*